United States Patent
Mormina et al.

(10) Patent No.: US 9,258,139 B2
(45) Date of Patent: Feb. 9, 2016

(54) METHOD FOR REGULATING DATA TRANSMISSION OVER A COMMUNICATION CHANNEL, CORRESPONDING DEVICE AND COMPUTER PROGRAM PRODUCT

(71) Applicant: STMicroelectronics Srl, Agrate Brianza (MB) (IT)

(72) Inventors: Vincenzo Mormina, Santa Croce Camerina (IT); Elio Rosario Blanca, Catania (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 244 days.

(21) Appl. No.: 14/067,811

(22) Filed: Oct. 30, 2013

(65) Prior Publication Data

US 2014/0140354 A1   May 22, 2014

(30) Foreign Application Priority Data

Nov. 20, 2012   (IT) .......................... TO2012A001008

(51) Int. Cl.
| | |
|---|---|
| *H04L 7/00* | (2006.01) |
| *H04J 3/06* | (2006.01) |
| *H04J 3/14* | (2006.01) |
| *H04J 3/16* | (2006.01) |
| *H04L 12/413* | (2006.01) |
| *H04L 27/18* | (2006.01) |

(52) U.S. Cl.
CPC .................. *H04L 12/413* (2013.01); *H04J 3/16* (2013.01); *H04L 27/18* (2013.01)

(58) Field of Classification Search
CPC ........... H04J 3/16; H04L 12/413; H04L 27/18
See application file for complete search history.

(56) References Cited

U.S. PATENT DOCUMENTS

| 8,451,819 B2* | 5/2013 | Chin .................... H04B 7/2681 370/350 |
| 2007/0258508 A1 | 11/2007 | Werb et al. |
| 2010/0002659 A1* | 1/2010 | Doi ...................... H04B 7/2696 370/338 |
| 2010/0316043 A1* | 12/2010 | Doi ..................... H04L 27/0006 370/350 |
| 2011/0249627 A1* | 10/2011 | Stanwood ............. H04L 12/413 370/328 |

OTHER PUBLICATIONS

Ira W. Cotton, "Technologies for local area computer networks", North Holland, Amsterdam, NL, vol. 4, No. 5, Oct. 1, 1980, pp. 197-208.
Italian Search Report dated Sep. 24, 2013 in connection with Italian Application No. IT 7020121008, 7 pages.

* cited by examiner

*Primary Examiner* — Ahmed Elallam
(74) *Attorney, Agent, or Firm* — Allen, Dyer, Doppelt, Milbrath & Gilchrist, P.A.

(57) ABSTRACT

Transmission of data frames over a channel in a communications network takes place on a slotted time base. A method comprises an evaluation, by at least one node of the network having a frame available for transmission, of whether the channel is available for transmission. If the channel is available for transmission, the available frame is transmitted over the channel in a subsequent slot of the slotted time base. If the channel is not available for transmission, owing to a frame (having a certain temporal length) being transmitted over the channel at a certain time, the slotted time base of the node is resynchronized as a function of the frame being transmitted. The resynchronization includes identifying, as a function of the certain temporal length, an interval of delay to evaluate again at a future time whether the channel is available for transmission.

20 Claims, 6 Drawing Sheets

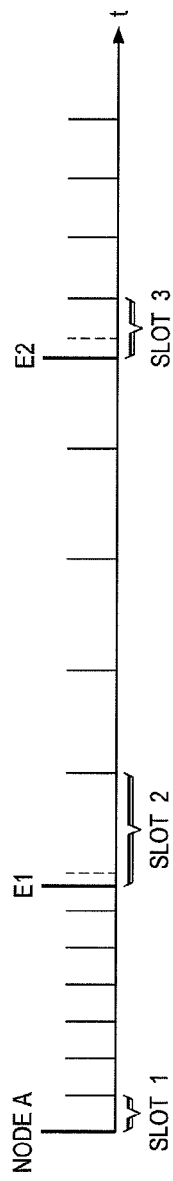
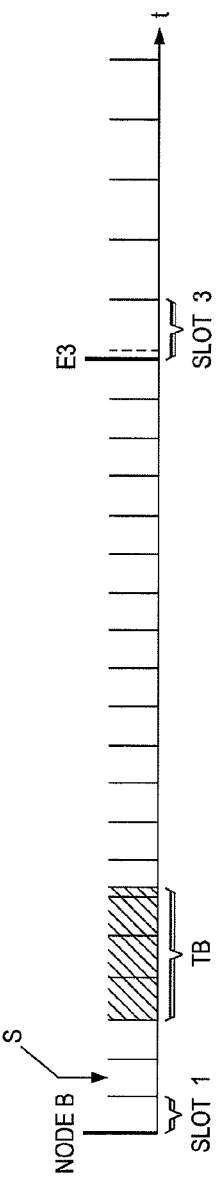
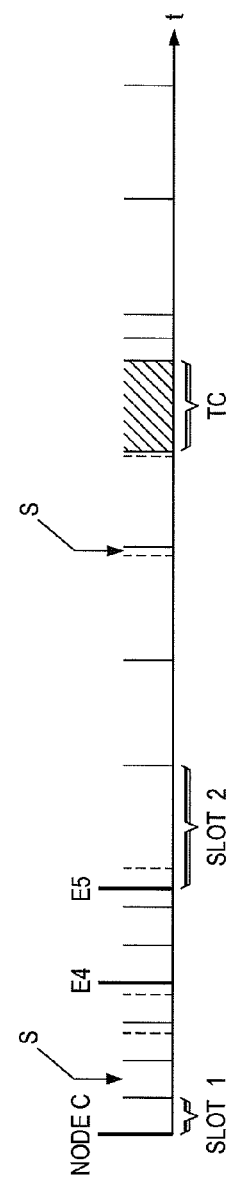
FIG. 2A
FIG. 2B
FIG. 2C

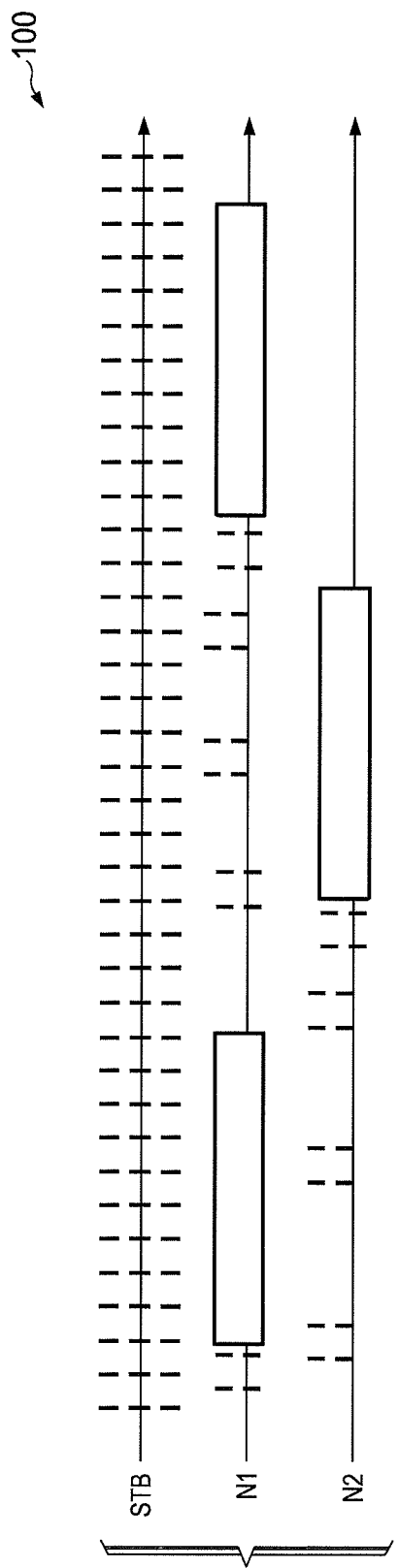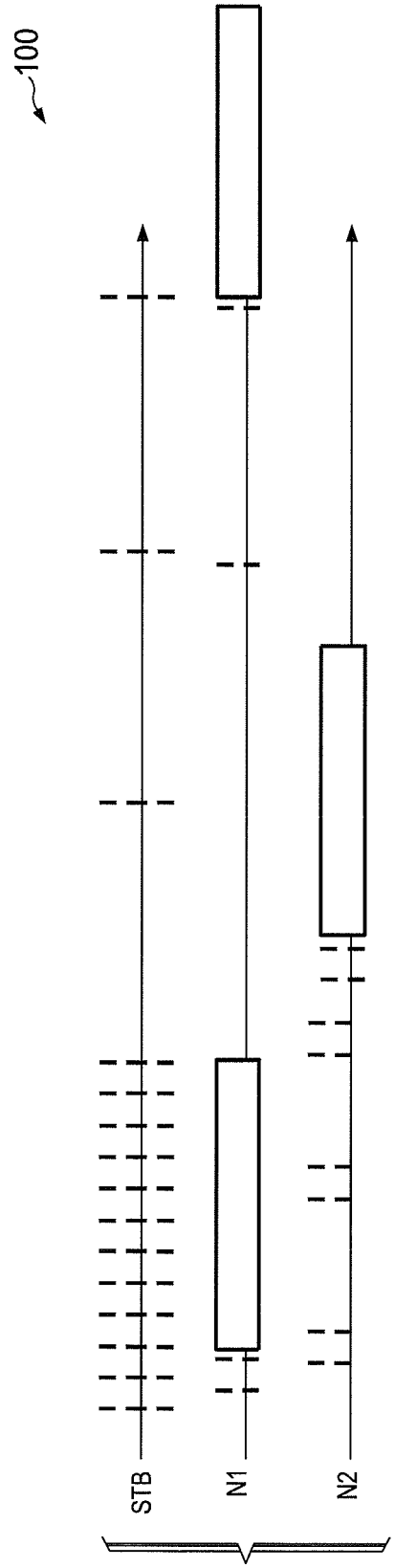
FIG. 6A
FIG. 6B

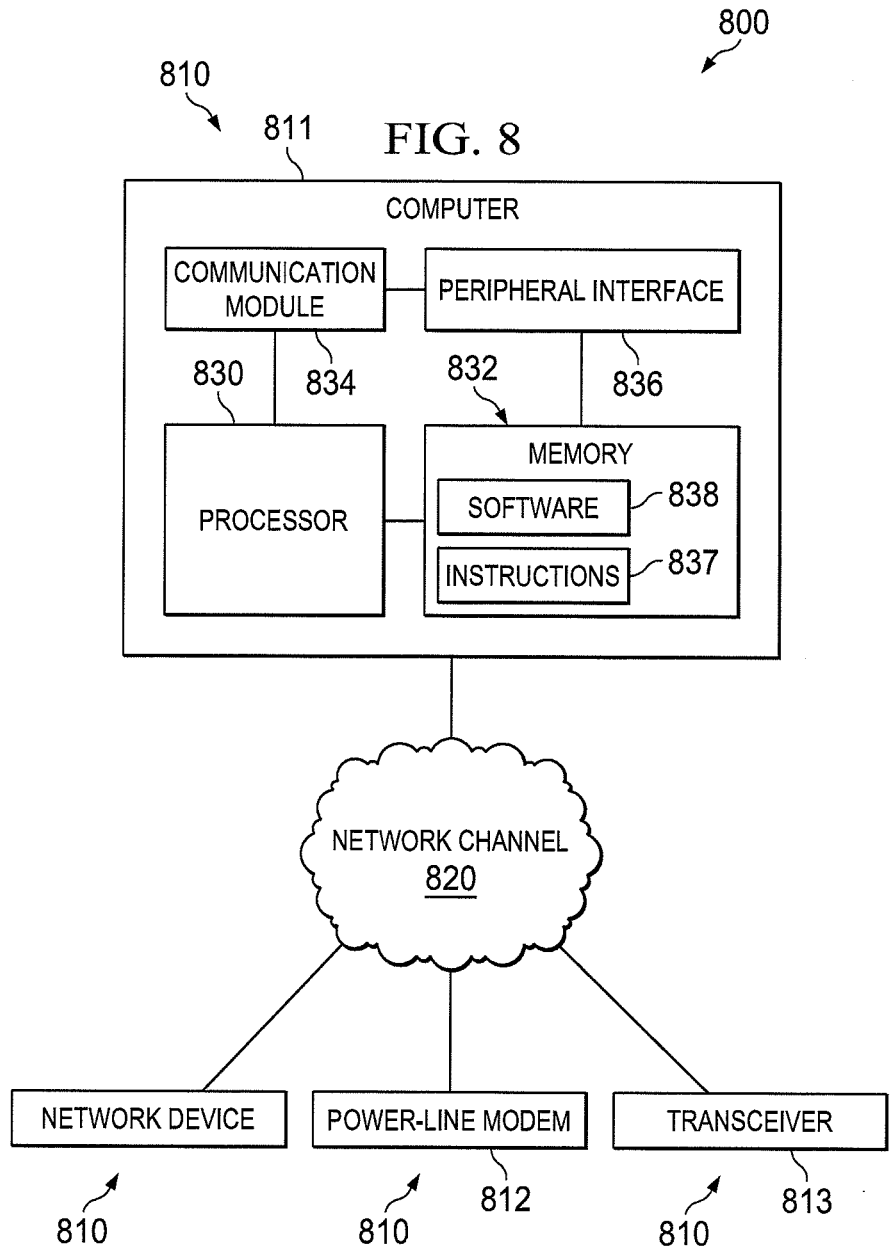

METHOD FOR REGULATING DATA TRANSMISSION OVER A COMMUNICATION CHANNEL, CORRESPONDING DEVICE AND COMPUTER PROGRAM PRODUCT

CROSS-REFERENCE TO RELATED APPLICATION(S) AND CLAIM OF PRIORITY

The present application claims priority under 35 U.S.C. §119(a) to Italian Patent Application Number TO2012A001008, filed on Nov. 20, 2012, entitled "A METHOD FOR REGULATING DATA TRANSMISSION OVER A COMMUNICATION CHANNEL, CORRESPONDING DEVICE AND COMPUTER PROGRAM PRODUCT." The content of the above-identified patent document is incorporated herein by reference.

TECHNICAL FIELD

The disclosure relates to communication techniques. Various embodiments may find application in devices for transmission on physical media in communication networks such as, for instance, modems, transceivers, and the like.

BACKGROUND

In the transmission on a data network, for example organized in frames, an important role is played by the strategies of access to the communication medium. These strategies aim at preventing—or else reducing—possible situations of collision that are likely to cause the loss of messages and of the information contained therein.

Devices such as modems, transceivers, and the like, which can be used for transmitting data over a physical medium (i.e., over a channel) in communication networks, can use various hardware systems for checking whether there is a transmission in progress (namely, for detecting the condition of "band in use"). Various solutions enable regulation of operation of the devices with procedures (for example, at a firmware level) aimed at implementing strategies of access to the resource represented by the physical medium or channel. These strategies are referred to as Carrier-Sense Multiple Access (CSMA), and fall within two basic categories: in one case aimed at avoiding collisions (also referred to as Collision Avoid or CA) and in the other case aimed at detecting collisions (Collision Detect—CD).

Power-line modem devices such as the ST7580 use a Phase Shift Keying (PSK) modulation with a generic frame comprising a preamble part containing synchronization information for the stream, modulation, and payload used for decoding the frame itself.

The Power-Line Modem devices are able to supply information on channel status (for example, free or occupied) only after decoding a preamble. During decoding of the preamble, the power-line modem devices are not able to supply information on the channel status. This delay of signalling of the "band in use" penalizes the performance of a classic CSMA/CA procedure.

Another problem is linked to the overall system architecture, which may comprise a microcontroller (e.g., STM32) and a Power-Line Modem (e.g., ST7580) connected via serial-communication peripherals, the microcontroller managing the data flows from and to the modem. The external control introduces a delay due to serial transmissions, the delay being proportional to the size of the packet exchanged.

In various solutions, the delay introduced by the serial communication between the microcontroller and the modem causes an increase of the interval in which the transmission channel is effectively "booked" by a transmission, and the devices belonging to the network are unable to verify the effective channel status.

SUMMARY

To address the above-discussed deficiencies, it is a primary object to provide, improved strategies of a CSMA-CA type, such as to prevent collision events in the access to a communication medium (channel) within a network, overcoming the drawbacks outlined previously.

Various embodiments are aimed at overcoming the above deficiencies. For example, the production lines of the present disclosure comprise platforms such as a microcontroller comprising a 32-bit ARM Cortex-M3 computer processing unit (CPU) (also referred to as STM32Fxx) and a Power-Line Modem device of the STARGREED NARROWBAND product family (also referred to as ST7580).

According to various embodiments, the above object is achieved using a method having the characteristics recalled in the ensuing claims.

Various embodiments also refer to a corresponding device (for example, a transmitter), as well as to a computer program product that can be loaded into the memory of at least one computer and comprises portions of software code that are able to implement the method when the product is executed by at least one computer. As used herein, reference to such a computer program product is understood as being equivalent to the reference to a computer-readable means containing instructions for control of the processing system in order to coordinate implementation of the method according to the present disclosure. The reference to "at least one computer" is evidently intended to highlight the capability of the present disclosure being implemented in a modular or distributed form.

The claims form an integral part of the technical teaching provided herein in relation to the present disclosure.

Various embodiments of the present disclosure enable implementation of a protocol that can be defined as CSMA/CA JAS (Joint Adaptive Slotted), namely, a strategy of access to the medium for communication networks based upon time slots of variable duration with self-synchronization of the nodes comprised in the network.

Various embodiments are suited to being implemented, for instance, on platforms, such as STM32 and ST7580, to which reference has already been made. Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Various embodiments will now be described, purely by way of non-limiting example, with reference to the annexed FIGUREs, wherein like numbers designate like objects, and in which:

FIGS. 2A, 2B and 2C illustrate three portions of a chronogram, representing modes of operation of embodiments according to the present disclosure;

FIG. 6A depicts a time plot example of operating nodes referred to slotted time bases where the slot value is kept constant according to embodiments of the present disclosure;

FIG. 6B depicts a time plot example of operating nodes referred to slotted time bases where the slot value the slot value is modified according to embodiments of the present disclosure;

FIG. 8 depicts a plurality of nodes communicating information within communication system through a physical medium according to embodiments of the present disclosure.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged computer electronic device.

The ensuing description includes various specific details aimed at providing an in-depth understanding of various examples. The other embodiments of the present disclosure may be obtained with more, less, or different components than described in the specific details, or with other methods, components, materials, and so forth. In other cases, known structures, materials, or operations are not illustrated or described in detail so that various aspects of the embodiments will not be unintentionally obscured by such details. The reference to "an embodiment" or "one embodiment" in the framework of the present description indicates that a particular configuration, structure, or characteristic described in relation to the embodiment is comprised in at least one embodiment. Hence, phrases such as "in an embodiment" or "in one embodiment" that may be present in various points of the present description do not necessarily refer to one and the same embodiment. Moreover, particular conformations, structures, or characteristics can be combined in any suitable way in one or more embodiments.

The references used herein are provided merely for the convenience of the reader and hence do not define the sphere of protection or the scope of the embodiments.

Figure 1:
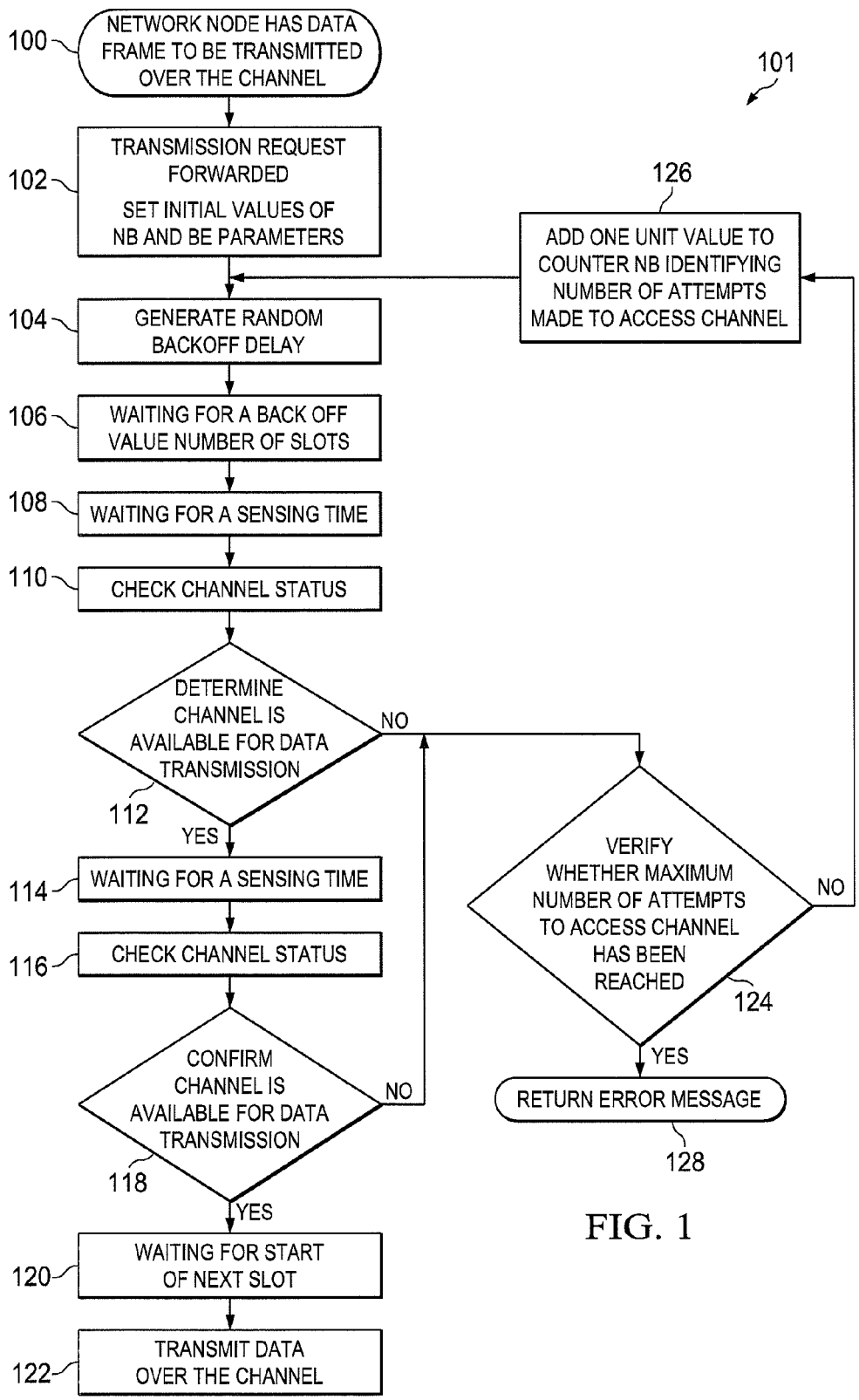
FIG. 1 depicts a flowchart of a method according to embodiments of the present disclosure.

The block diagram of FIG. 1 depicts a procedure 101 or process 101 of a CSMA/CA type used for regulating transmission of data frames using a resource (i.e., a communication channel) in the framework of a communications network.

Various embodiments refer to an operation of a "slotted" type, that is, set on a time base organized in elementary time intervals referred to as "slots."

FIG. 1 depicts a sequence of processes that may be performed in a generic node of a network used for exchange of data organized in frames by a plurality of nodes generically identified as A, B, C, and so forth.

The operations described in what follows may be executed in any channel device of the type described above previously, which is programmed for execution of the operations at a software/firmware level.

The diagram of FIG. 1 exemplifies operations executed by a node (generic term to indicate any channel device: modem, transceiver or the like) that has a data frame available for transmission over the channel.

Starting from an initial block 100, a certain node of the network has available a data frame to be transmitted over the channel and forwards a corresponding transmission request, in a block 102 two parameters NB and BE are set at respective initial values, the parameters representing, for instance:

the number NB of attempts to access the channel made by the device or node starting from a specified initial moment; and a parameter (for example, an exponent) BE that can be used for determining, according to an exponential law, the duration of an interval, referred to as "backoff interval" (BO), within which the node makes an attempt to access the channel, namely an attempt at transmitting data over the channel.

By way of example, in block 102 the two parameters can be fixed at the following initial values:

NB=0 (that is, no attempt to access the channel has been made previously); and

BE=minBE (that is, corresponding to a minimum value of the interval within which there is determined, for example randomly and according to known criteria, the backoff time within which the node makes a new attempt to access the channel).

The next block 104 includes generating (according to known criteria) a random backoff delay within an interval between 0 and 2BE-1. For example, generating a random backoff delay using a unit of time equal to one slot as the basic backoff interval (i.e., as time-count unit).

The subsequent blocks 106, 108 and 110 (which may also be executed upon negative outcome from block 124 referred to hereinafter) include:

block 106: waiting for a number of slots specified by the backoff value BO calculated in block 104;

block 108: waiting for a sensing time; and block 110: a (first) check on channel status.

The outcome of the check of block 110 is verified in block 112 in order to establish whether the channel is available for transmission of data frames by the transmitter.

If the corresponding verification procedure indicates that the channel is not busy (output Y=YES from the verification block 112), after waiting for a subsequent sensing time (block 114), the program passes to a further check on channel status (block 116), the outcome of which is verified in a block 118.

Once it has been confirmed that the channel is not busy (output Y=YES from the verification block 118) the node or transmitter proceeds to transmitting over the channel.

In various embodiments, this may take place after waiting (block 120) for start of the next slot.

The action of transmission is represented by block 122.

If, instead, the verification blocks 112 and 118 yield a negative outcome (N=NO), hence indicating that the channel is busy, in a block 124 a check is made to verify whether the value of attempts to access made up to that moment (i.e., the current value of NB) has reached a maximum value that has been set (for example, set in a way that may vary according to the specific needs of use).

If the maximum value of the admissible attempts has not been reached (that is, an output N=NO from block 124) the system returns to block 104, after the following steps have been taken in a block 126:

incrementing the value of the counter NB that identifies the number of the attempts at access made up to that moment by one unit, and incrementing the value of BE in the exponential relation considered previously so as to extend the range of possible values for definition of the backoff delay time BO.

If, instead, block 124 yields a positive outcome (Y=YES), indicating that the number of attempts at access to the channel has reached the maximum value set, transmission is considered to have failed, and in a block 128 a corresponding error message is returned.

The chronogram of FIGS. 2A, 2B, and 2C depict various events of transmission or synchronization of three nodes assigned to a channel and designated, respectively, by node A (shown in FIG. 2A), node B (shown in FIG. 2B), and node C (shown in FIG. 2C). In various embodiments, each of the nodes A, B, C can be configured so as to implement the process 101 described above.

The time plots of FIG. 2A (node A); FIG. 2B (node B); and FIG. 2C (node C—part c) ideally refer to nodes initially synchronized starting from a common instant (zero point of the three time scales of the three parts of the diagram set on top of one another) and using a slot duration equal to "slot 1" as time base.

FIG. 2B depictsa situation in which the node B has a frame (i.e., a packet) of data available to be transmitted and a random backoff delay calculated equal to 1.

The node B carries out the checks corresponding to blocks 100-112 and 116-118 of FIG. 1 (with positive outcome of both of the checks of blocks 112 and 118), detecting the absence of frames transmitted over the channel for a certain sensing time S (e.g., two consecutive slots) and proceeding then to transmission of the frame, designated by TB.

In various embodiments, data or signals indicating the temporal length (for example, of the payload) and the time (for example, the final instant) of transmission of TB may be available in the network, such as in the case that the data or signals are available at the nodes A and C. As will be seen more clearly in the following description, in various embodiments, the nodes A and C, in this way re-synchronize the slotted time base with which the nodes work as a function of the temporal length and/or of the transmission time of TB.

FIG. 2C depicts a situation in which also the node or station C has started a transmission procedure, for example with a backoff value equal to 2.

During the corresponding sensing procedure (designated also here by S), the node C first detects the availability of the channel for transmission (blocks 110-112 of the diagram of FIG. 1, with positive outcome of the check of block 112). And then detects, the node C detects an event E4 (more particularly described in reference to FIG. 4) corresponding to blocks 116-118 of the diagram of FIG. 1 with negative outcome of the check of block 118. The node C detects that the node B has in the meantime entered the frame TB on the channel, so that the channel is no longer free (namely, available for transmission by the node C).

At this point, the node C operates according to the sequence of blocks 126 and 104 in FIG. 1 with the procedure of (re)calculation of the backoff of block 104 that returns a value (for example, a value equal to 5 slots).

As previously described, in various embodiments of the present disclosure, the nodes A and C re-synchronize their slotted time base as a function of the temporal length or as a function of the transmission time of TB (that is, the frame transmitted by the node B).

Events E1 of FIG. 2A and E5 of FIG. 2C are examples of this operating mode, representing the fact that the nodes A and C:

adapt the width of their slot to a value "slot 2" different from the value "slot 1" used previously, with the value of "slot 2" established as a function of the size (for example, of the payload) of the frame TB transmitted by the node B; and reset the starting time of the respective time base by getting the starting time to coincide with the instant of the end of transmission of TB.

In certain embodiments, the value of "slot 2" is a function of the temporal length of the payload transmitted by the node B.

In certain embodiments, as shown in FIG. 2B, the slot of the node B maintains a duration at the value "slot 1" so that the slot of the node B remains unvaried (whilst the nodes A and C are resynchronized)irrespective of which of the nodes may send the next packet. The contest between the nodes will take place on the basis of a common timing.

For instance, it may be assumed that the node C, which has available for transmission a data frame TC that has not managed to transmit previously, will continue to count the slots elapsed (with a value "slot 2"). Once the fifth count has been reached, node C will start a new sensing procedure S.

This time, the node C carries out the checks corresponding to blocks 100-112 and 116-118 of FIG. 1, obtaining positive outcomes for both of the checks of blocks 112 and 118, and then proceeds to transmission of its frame TC.

In turn, using the same mechanism described above in relation to the nodes A and C, the nodes A and B (namely, the nodes different from the node C that has transmitted its frame TC) re-synchronize the slotted time base with which the nodes work (events E2 and E3 of FIGS. 2A and 2B, respectively) as a function of the temporal length (e.g., of the payload) of TC and of the time (for example, to the end) of transmission of frame TC.

As previously described for the node B, now the slot of node C remains unvaried whilst the nodes A and B are re-synchronized and, irrespective of which of the nodes may send the next packet, the contest between the nodes will take place on the basis of a common timing.

The representations with a dashed line in FIGS. 2A, 2B, and 2C highlight the fact that, in various embodiments of the present disclosure and as already described previously, the actions of sensing is performed before (for example, 1 ms before) elapsing of the corresponding time slot. This operating mode enables start of transmission of the frame at the starting instant of the next time slot so that the device is able to signal at the sensing instant the fact that a valid frame is being transmitted.

FIGS. 3 through 7 depict more particular detail for specific aspects of embodiments according to the present disclosure.

Figure 3:
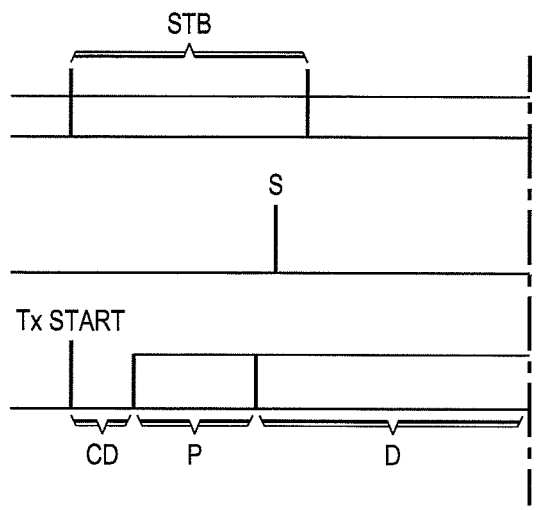
FIG. 3 depicts a time plot of discretizing the time of the network on a slotted time base according to embodiments of the present disclosure.

FIG. 3 depicts that a first step towards a controlled access to the medium includes discretizing the time of the network on a slotted time base (STB), that is, a time base organized in regular intervals, namely, the "slots."

This means that the communication delays (for example, the delay due to deciphering of the preamble, which renders transmission in progress not identifiable) can be predicted and managed so as to proceed to testing of the channel only when there is the certainty of detecting valid information regarding the whether the channel is busy or else free.

FIG. 3 shows an example of times of a transmission, where the node (e.g., a microcontroller) starts transmission at the starting instant "Tx Start" of a slot. The interval CD (Communication Delay) exemplifies a possible delay due to serial transmission.

As soon as the packet is received, it is possible to start transmission of the preamble P and, then, of the payload D (Data).

According to embodiments of the present disclosure, as a result of synchronization of the nodes in the terms described previously, (for instance in relation to FIG. 2) a node that intends to start a transmission checks the status of the medium (channel) at a sensing instant S.

In certain embodiments, the recurrence of the sensing instant S can be determined. In the case of sending of a frame, it is ensured that the preamble is decoded, so that, each modem is able to signal that the channel is busy. If this does not happen, at the next sensing carried out on the next slot, valid and reliable information on the channel status is ensured. A possible advantage, in addition to having reliable information on the status of the medium/channel, lies in the fact that the test on the channel status is carried out at most twice.

Figure 4:
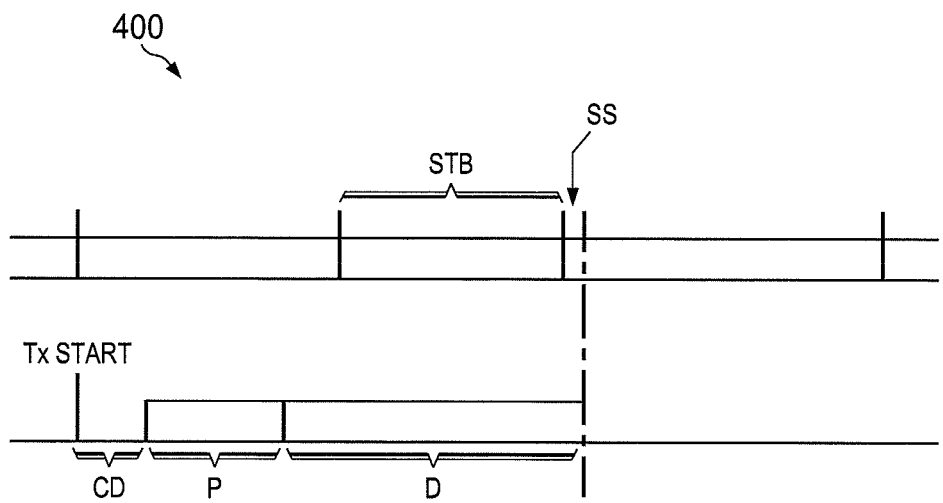
FIG. 4 depicts a time plot of introducing a synchronization of the nodes of the network by exploiting the flow of data in the channel according to embodiments of the present disclosure.

FIG. 4 shows that, in certain embodiments, another process towards accessing the medium being checked includes introducing a synchronization of the nodes of the network obtained, for example, by exploiting the flow of data in the channel (e.g., bus). For instance, each valid transmission, of any type, can be used as a synchronization interrupt for synchronizing the transmission bitstream with the slots of each node, in such a way that the sensing sequence will yield a certain result.

FIG. 4 shows a process 400 of slot synchronization. FIG. 4 includes various references previously described in relation to FIG. 3 with identical meaning.

In various embodiments, reception of a frame can in fact cause an event that can be used for synchronizing the timers of the various nodes. For example, as described with reference to FIG. 2, the event can give rise to a slot resynchronization (Slot Sync or SS), which also causes to a renewed time rate.

A possible advantage of this procedure is that no dedicated packet (for example, the beacons) is used and hence no additional band is used. According to embodiments of the present disclosure, the physical layer is able to synchronize the Data Link layer, upon transit of any frame, so as to synchronize the entire network.

Figure 5:
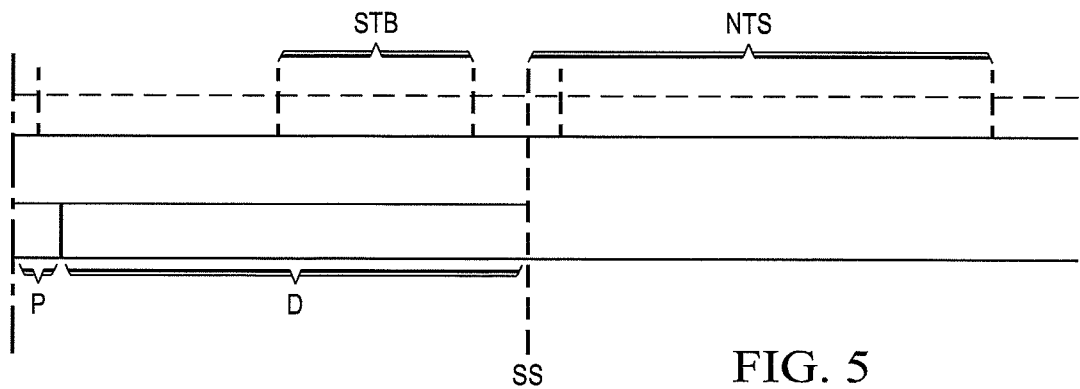
FIG. 5 depicts a time plot of introducting a self-adaptation of a slot according to embodiments of the present disclosure.

FIG. 5 shows an introduction a self-adaptation of the slot according to embodiments of the present disclosure.

In certain embodiments (for example, as described in relation to FIG. 2) include adapting the slot to the length (and thereby to the duration) of transmission. For example, adapting the slot to the the length of the duration of the payload.

In various embodiments, in time periods in which in the network there are travel packets of limited length (e.g., 10-20 bytes), the slots are relatively short. In the periods in which in the network there are travel long packets (e.g., 150-200 bytes), the slots are relatively long.

FIG. 5 shows a graphic representation of an embodiment of self-adaptation of the slot. FIG. 5 includes various references previously described in relation to FIG. 3 or 4 with identical meaning.

In various embodiments, the arrival of a frame (P=preamble; D=data) can cause not only a resynchronization SS of the slot, but also adaptation of its size to a new value NTS. For example, as shown in FIGS. 2A, 2B, and 2C, adaption to pass from "slot 1" to "slot 2" and then to "slot 3").

In certain embodiments, the slot is no longer a fixed parameter. The slot can become a dynamic characteristic configured as a function of the duration of the serial transmission (e.g., between microcontroller and modem, hence depending upon the Baud rate and upon the type of peripheral UART—SPI, and so forth). Alternatively, the slot can be a dynamic characteristic configured as a function of the duration of transmission in the physical medium (hence depending upon the type of modulation, B-PSK, 8-PSK, and so forth).

In certain embodiments, having available an adaptive slot enables reduction of the rate of checks of the channel and hence reduction of the load of the CPU of the microcontroller.

FIGS. 6A and 6B show a graphic representation of examples of operation regarding two generic nodes N1 and N2 referred to slotted time bases (STBs), where:
in FIG. 6A, the slot value is kept constant, and
in FIG. 6B, the slot value is modified, for example increased, as likewise shown in FIGS. 2A and 2B for the nodes A and B. That is, in FIGS. 2A and 2B, following the events E1 and E5, the nodes A and B increase their slot from "slot 1" to "slot 2."

Consequently, the number of checks on the physical medium, FIG. 6B is clearly less than the number of checks of FIG. 6B, with a consequent reduction of operations by the CPU (microcontroller).

In various embodiments, the adaptation of the duration of the slot tslot may be made according to simple formulas.

For instance, in a USART context, with PSK modulation, to the following setting are set:

$$t_{slot} = t_{us} + t_{pr} + \delta_s$$

where $t_{us}$=time_usart $t_{pr}$=time_preamble $\delta_s$=time_safety $$t_{us} = (n+5) * \left( \frac{8+2}{Br} + t_{ib} \right) = (n+5) * \delta_{char\_U}$$

$t_{pr}$=const=7880 µs $\delta_s$=833 µs→900 µs (PSK transmission time)
$t_{ib}$44 µs (USART intebytetime) $\delta_{char_{char}\_U}$=220 µs (USART transmission time) i.e., $$t_{slot} = n * \delta_{char\_U} + 16560$$

whence $$t_{sens} = t_{slot} - \delta_s + \delta_{char}.$$

The increment of the exponent BE means that the range of values admissible for calculating the backoff delay BO widens.

Figure 7:
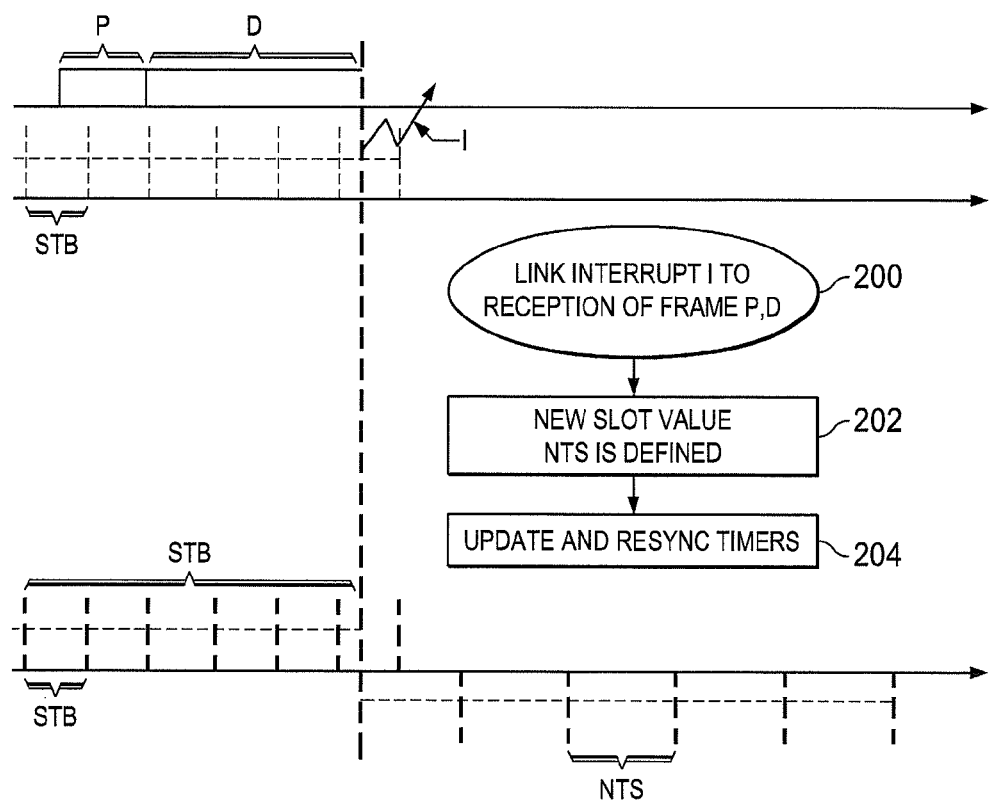
FIG. 7 depicts a time plot example of a slot-synchronization mechanism according to embodiments of the present disclosure.

FIG. 7 depicts a slot-synchronization mechanism according to embodiments of the present disclosure. FIG. 7 includes various references previously described in relation to FIGS. 3 to 6, with identical meaning.

In the example appearing in FIG. 7, an interrupt I generated by reception of a frame (P=preamble; D=Data) is used as an event of timer resynchronization, passing to a new slot value NTS, reconfigured with new parameters linked to the length of the packet received (for example, temporal length of the payload D=Data), as described previously.

Certain embodiments can, for this purpose, use two timers: one for the sensing instant and one for the slot.

The flowchart portion of FIG. 7 shows a block 200, representing the interrupt I linked to reception of the frame P, D. In block 202, according to a relation NTS=f (length of the payload D), the new slot value NTS is defined. In block 204, the program to updates and resynchronizes the timers.

The behaviour of embodiments described herein has been subjected to testing in critical conditions, such as to generate normally a contest in access to the medium and hence also collisions between frames.

For instance, in a test, TEST 1, the case where a Master node (M) sends to another four nodes a request for data with broadcast destination address, such as to generate a simultaneous reply by all the nodes, which, attempting to send their own frame, contend for access to the medium. When the Master node M sends its requests, each node queried counts them and returns this datum once again to the Master M. The Master node M counts how many replies are received from each node.

In a test, TEST 2, four nodes send, at random intervals, data packets to a Master node M, in a way similar to what occurs, for example, in a sensor network. The random intervals were generated between 1.5 and 4 s, and the packets sent were 400. Also in this case the Master node M gathers the packets sent by each node and counts them.

The results of the two tests described above appear in the tables below, for TEST 1 and TEST 2, respectively.

TABLE 1

RESULTS OF TEST 1

|  | Packets received by node | Replies received by M | % |
| --- | --- | --- | --- |
| Node 1 | 396 | 370 | 93.43 |
| Node 2 | 396 | 365 | 92.17 |
| Node 3 | 396 | 365 | 92.17 |
| Node 4 | 396 | 367 | 92.67 |

TABLE 2

RESULTS OF TEST 2

|  | Packets sent to M | Packets received by M | % |
| --- | --- | --- | --- |
| Node 1 | 400 | 390 | 97.50 |
| Node 2 | 400 | 391 | 97.75 |
| Node 3 | 400 | 388 | 97.00 |
| Node 4 | 400 | 385 | 96.25 |

It has likewise been assessed how many potential collisions it is possible to detect (and hence avoid) using 32-byte packets. It has been noted that various embodiments enable values of 93.50% to be reached as against values of 65.17%, which can be achieved with traditional CSMA/CA techniques.

A further test was conducted, once again with reference to the performance in terms of collision avoidance, with 240-byte packets. It has been noted that various embodiments enable once again values of 93.50% to be reached, as against values of 76.60% that can be reached with traditional CSMA/CA techniques.

According to embodiments of the present disclosure, the slot is rendered adaptive, with the consequent possibility of reducing or else intensifying the actions of sensing according to the length of the packets. This enables, for example, reduction of the number of sensing actions, with a reduction by an amount that increases as the length of the frames increases, achieving, for instance, reductions in the region of 8.18% to 13.14% for frame lengths greater than 200 bytes.

FIG. 8 depicts a communication system 800 including a plurality of nodes 810 communicating information within through a physical medium 820 according to embodiments of the present disclosure. Although certain details will be provided with reference to the components of the system 800, it should be understood that other embodiments may include more, less, or different components.

Examples of a channel device 810 (also referred to as a node) include a microcontroller, a computer 811, a power line modem 812, and a transceiver 813, and the like. The nodes 810 can be the same as nodes A, B, and C and nodes N1 and N2 of FIGS. 2A through 7. The node 810 includes executable instructions 837 stored in a machine-usable, computer-usable, or computer-readable medium in any of a variety of forms, wherein the instructions cause the processing circuitry to perform processes according to the present disclosure (for example, as shown in FIG. 1). For example, the instructions 837, when executed, cause processing circuitry (for example, including processor 830) to perform operations for regulating data transmission over a communication channel. Other types of network devices 810, such as the power-line modem 812 and transceiver 813, can include hardware and software components similar to the computer 811 to execute the instructions 837.

The computer 811 includes a processor 830 or other processing circuitry, memory 832, a communication module 834, and a peripheral interface 836. The memory 832 may include any suitable volatile or non-volatile storage and retrieval device(s). For example, the memory 832 can include any electronic, magnetic, electromagnetic, optical, electro-optical, electro-mechanical, or other physical device that can contain, store, communicate, propagate, or transmit information. The memory 832 can store data and instructions for use by the processor 830.

The processor 830 is coupled to the communication module 834, the memory 832, and the peripheral interface 836. In certain embodiments, the processor 830 controls the communication module 834, the memory 832, and the peripheral interface 836.

The communication module 834 sends and receives control signals and data packets to and from other network devices. For example, the node 810, through the communication module 834, communicates with one or more of the network devices utilizing a wired connection, a near field communication (NFC), wireless fidelity (Wi-Fi) (e.g., IEEE 802.11) communication, BLUETOOTH low energy (BLE) communication, or any other suitable wireless communications protocol.

In certain embodiments, the memory 832 includes the instructions 837 and software 838 configured to be executed by a node 810 that has a data frame available for transmission over the channel 820. For example, the software 838 can include an operating system stored in the memory 832.

Of course, without prejudice to the principles of the present disclosure, the details of construction and the embodiments can vary, even significantly, with respect to what has been illustrated herein purely by way of non-limiting examples, without thereby departing from the extent of protection. The extent of protection is defined by the annexed claims.

Although the present disclosure has been described with examples, various changes and modifications may be suggested to one skilled in the art. It is intended that the present disclosure encompass such changes and modifications as fall within the scope of the appended claims.

What is claimed is:

1. A method of regulating transmission of data frames over a channel in a communications network, wherein the transmission is on a slotted time base and the method includes:
evaluating, by at least one node in the network having a frame available for transmission, whether the channel is available for transmission based upon an initially synchronized slotted time base; and
if the evaluation indicates that the channel is available for transmission, transmitting the available frame on the channel; and
if the evaluation indicates that the channel is unavailable for transmission due to a frame being transmitted over the channel at a certain time and having a certain time length, re-synchronizing the slotted time base of the at least one node in the network as a function of the frame being transmitted by identifying as a function of the certain time length a delay interval to evaluate again at a subsequent time whether the channel is available for transmission of the available frame.

2. The method of claim 1, wherein evaluating includes at least two subsequent checks of whether the channel is available for transmission, the at least two subsequent checks being separated by a sensing interval.

3. The method of claim 1, wherein the evaluating includes checking whether the channel is available for transmission over a plurality of slots of the slotted time base.

4. The method of claim 3, wherein the plurality of slots consists of two time slots.

5. The method of claim 1, wherein the certain time length is the time length of the payload of the frame being transmitted over the channel.

6. The method of claim 1, wherein transmitting the available frame on the channel is performed without re-synchronizing the slotted time base of the node that transmits the available frame.

7. The method of claim 1, wherein the nodes in the network different from the node that transmits the available frame over the channel resynchronize their slotted time base as a function of the certain time length and the certain time.

8. The method of claim 1, wherein evaluating whether the channel is available for transmission is performed before the expiry of a certain slot of the slotted time base, and wherein, if the evaluation indicates that the channel is available for transmission, the available frame is transmitted in the slot of the slotted time immediately following the certain slot.

9. The method of claim 1, wherein the value of the delay interval for evaluating again whether the channel is available for transmission at a subsequent time is increased as a function of the number of times in which the channel is ascertained to be unavailable for transmission.

10. The method of claim 1, further comprising returning a message indicative of transmission failed if the number of times in which the channel is ascertained to be unavailable for transmission equals an upper limit value.

11. A device for transmitting data frames over a channel in a communications network wherein the transmission is on a slotted time base, the device comprising:
a processor and a memory coupled thereto configured to
have a frame available for transmission based upon an initially synchronized slotted time base,
evaluate whether the channel is available for transmission,
if the evaluation indicates that the channel is available for transmission, transmit the available frame on the channel, and
if the evaluation indicates that the channel is unavailable for transmission due to a frame being transmitted over the channel at a certain time and having a certain time length, re-synchronize the slotted time base as a function of the frame being transmitted by identifying as a function of the certain time length a delay interval to evaluate again at a subsequent time whether the channel is available for transmission of the available frame.

12. The device of claim 11, wherein evaluating whether the channel is available for transmission includes at least two subsequent checks of whether the channel is available for transmission, the at least two subsequent checks being separated by a sensing interval.

13. The device of claim 11, wherein the evaluating whether the channel is available for transmission includes checking whether the channel is available for transmission over a plurality of slots of the slotted time base.

14. The device of claim 11, wherein the certain time length is the time length of the payload of the frame being transmitted over the channel.

15. The device of claim 11, wherein transmitting the available frame on the channel is performed without re-synchronizing the slotted time base of the device.

16. The device of claim 11, wherein evaluating whether the channel is available for transmission is performed before the expiry of a certain slot of the slotted time base, and wherein, if the evaluation indicates that the channel is available for transmission, the available frame is transmitted in the slot of the slotted time immediately following the certain slot.

17. A non-transitory computer-readable medium encoded with executable instructions that, when executed by a processing circuitry, cause one or more processors to:
evaluate whether the channel is available for transmission based upon an initially synchronized slotted time base;
if the evaluation indicates that the channel is available for transmission, transmit the available frame on the channel; and
if the evaluation indicates that the channel is unavailable for transmission due to a frame being transmitted over the channel at a certain time and having a certain time length, re-synchronize the slotted time base as a function of the frame being transmitted by identifying as a function of the certain time length a delay interval to evaluate again at a subsequent time whether the channel is available for transmission of the available frame.

18. The non-transitory computer-readable medium of claim 17, wherein evaluating whether the channel is available for transmission includes at least two subsequent checks of whether the channel is available for transmission, the at least two subsequent checks being separated by a sensing interval.

19. The non-transitory computer-readable medium of claim 17, wherein the evaluating whether the channel is available for transmission includes checking whether the channel is available for transmission over a plurality of slots of the slotted time base.

20. The non-transitory computer-readable medium of claim 17, wherein the certain time length is the time length of the payload of the frame being transmitted over the channel.

* * * * *